Figure 1:
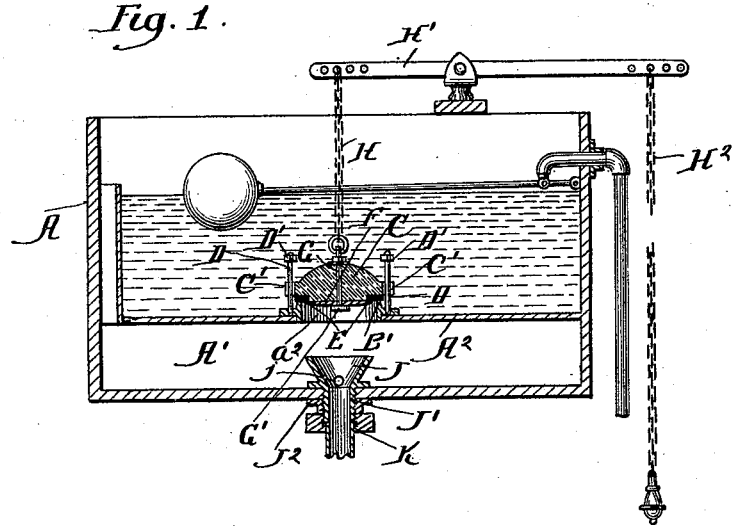

(No Model.) 2 Sheets—Sheet 1.

F. A. WELLS.
WATER CLOSET TANK VALVE.

No. 456,178. Patented July 21, 1891.

Witnesses:
Jean Elliott
Julia Usler

Inventor:
Frank A. Wells
By Burton and Burton
Attorneys (No Model.)  2 Sheets—Sheet 2.

F. A. WELLS.
WATER CLOSET TANK VALVE.

No. 456,178. Patented July 21, 1891.

Witnesses:

Inventor:
Frank A. Wells

UNITED STATES PATENT OFFICE.

FRANK A. WELLS, OF PASSAIC, NEW JERSEY.

WATER-CLOSET-TANK VALVE.

SPECIFICATION forming part of Letters Patent No. 456,178, dated July 21, 1891.

Application filed August 26, 1890. Serial No. 363,109. (No model.)

*To all whom it may concern:*

Be it known that I, FRANK A. WELLS, a citizen of the United States, residing at Passaic, county of Passaic, and State of New Jersey, have invented certain new and useful Improvements in Water-Closet-Tank Valves, which are fully set forth in the following specification, reference being had to the accompanying drawings, forming a part thereof.

The purpose of this invention is to provide a valve for a water-closet tank or cistern which discharges through a large opening in order that the discharge may be rapid, and for which, therefore, a large valve is required, such valve being seated by its weight in water, and being for that further purpose necessarily large and made of heavy material which is not corroded nor dissolved in the water. Such valves have heretofore been made out of or weighted with iron, because, notwithstanding that material is easily corroded with water, the weight necessary makes the more valuable and less easily corroded metal—such as copper—too expensive. I purpose to make such valve of glass or other vitreous substance, such as hard-baked earthenware (among the constituents of which a vitreous flux is necessarily present, giving it hardness and insolubility) or substance made of water-proof cement. I prefer distinctly vitreous substance, such as those indicated, or superficially-glazed earthenware or similar substance, the glazing answering the purpose of excluding the water and being non-corrosive. By employing such substance not liable to corrosion in water the objections to the iron weight-valve in common use are avoided. These objections are that the water becomes so charged with iron by the corrosion of the valve therein that the earthenware of the closet which the tank supplies becomes by the constant flow of the iron-charged water over it permanently discolored and the valve itself rapidly wastes, so that its packing-washers, of rubber or leather, have to be frequently renewed, while such valves are used in tanks employed other than for flushing purposes. The impregnation of the water with oxide of iron seriously interferes with the usefulness of the same for its purpose. Furthermore, weighted valves made of glass or earthenware are cheaper even than those made of iron and very much cheaper than such valves made of the less easily corroded metals, such as copper. For the same reasons I prefer to make the valve-seat, as far as possible, of similar substance not susceptible of corrosion, and when the form of the valve requires the exposure of considerable surface of the seat in the tank it is as important to make the seat of such material as to make the valve of the same.

Figure 2:
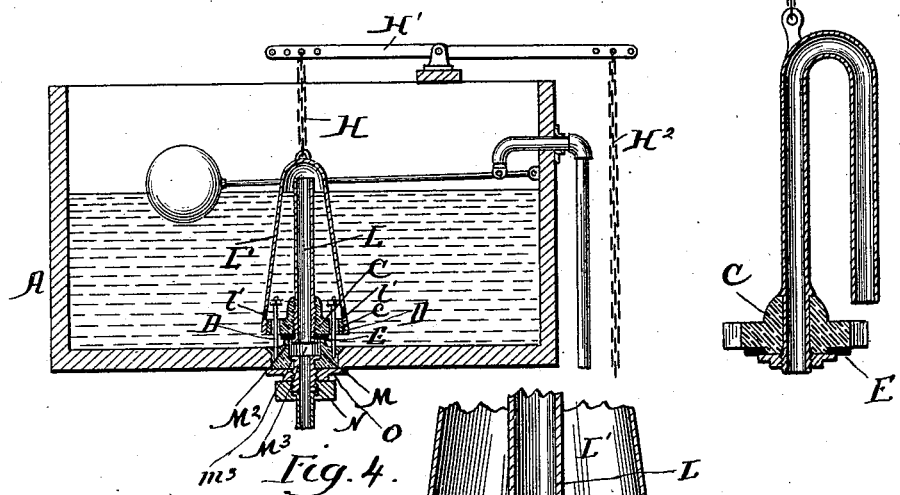
Figure 3:
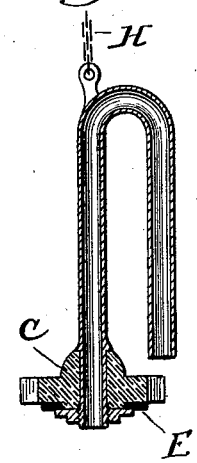
Figure 4:
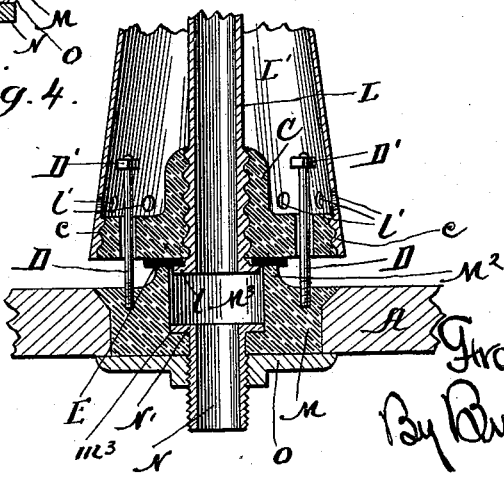
Figure 5:
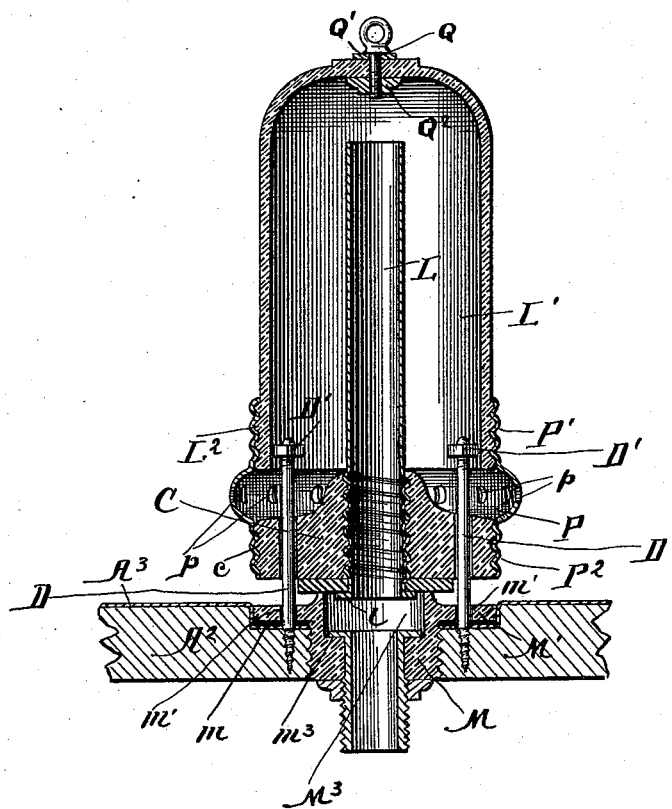

In the drawings, Figure 1 represents a vertical section of a tank with a service-box, showing the controlling-valve and the usual operating-connections. Fig. 2 is a similar view of a single-compartment tank—that is, one without a service-box—having both the valve and its seat made of the material indicated. The valve in this instance is what may be termed a "siphon-valve," that is, it has a siphon in connection with it through which the tank is evacuated, the siphon being set in action by the first opening of the valve by the flow of water past the seat and continuing to act after the valve is closed, discharging through the valve and not past its seat. Fig. 3 is a detail section of a similar valve with a slightly different form of siphon. Fig. 4 is an enlarged detail of the construction of valve and seat shown in Fig. 2. Fig. 5 is a vertical section of a modified form of both valve and seat, showing particularly a different mode of securing the seat in the tank-bottom and a construction adapted for employment of a glass bell or hood to form the outer limb of the siphon.

A represents the tank, and A' in Fig. 1 the service-box, $A^2$ being the bottom of the tank proper, constituting a partition between the same and the service-box.

$a^2$ is the discharge-opening through the bottom of the tank into the service-box.

B in Fig. 1 is the valve-seat, which is represented as being of the usual material and construction as a brass fitting properly secured in the opening $a^2$.

C is a valve, which is of glass, earthenware, porcelain, or similar material, as above described. It is formed with two side notches C' C', which serve as means by which it is guided on guide-bolts D D, which are secured to and project upward from the fitting in which the seat is formed at opposite sides thereof. Stop-nuts D' are provided at the upper end of the guide-bolts D to limit the lift of the valve. The valve D may have a ground face to fit its seat without cushioning or packing; but, if desired, it may have instead the leather or rubber packing washer E, being of annular form, seated in the rabbet formed at the lower margin of the valve C and retained by a keeper F, which is a thin copper disk held in place by the head G' of the stem G of the valve, said stem being inserted through a central opening formed in the valve for that purpose and adapted to be drawn tight by a nut at either end. The head G' may be such nut.

H is a chain secured at the upper end of the valve-stem, by which it is lifted by means of the lever H' and pull-chain $H^2$.

J is a funnel, which constitutes the discharge from the service-box A'. It is located directly below the valve-orifice $a^2$, and at the upper end or mouth is somewhat larger than said orifice, so that it receives the full amount of the stream from the orifice. It is contracted below to a suitable size for flushing-pipe, the contracted portion J' being screwed to the bottom of the service-box and stopped by the shoulder $j'$ and clamped tightly to the service-box by the rim-nut $J^2$, the threaded end projecting beyond said nut constituting a spud for connection in a familiar manner by coupling to the flushing-pipe K.

Small apertures $j$ are provided through the funnel at the bottom of the service-box, through which the water can pass more slowly than it can through the mouth to serve as a slow afterfill or afterwash for the closet. The mode of operation of this construction will be obvious. The valve being lifted by the pull, the water will discharge freely from the tank through the large aperture $a^2$ and will be received by the mouth of the funnel J and constitute the first flushing or forewash; but the funnel not being able to carry off the entire quantity discharged through the aperture $a^2$, the remainder will accumulate and fill the service-box. After the valve is allowed to seat the quantity of water in the service-box will pass out through the funnel as rapidly as the size of the flushing-pipe will permit until the water has fallen to the level of the upper mouth of the funnel, and thereafter will pass out more slowly through the apertures $j$, constituting the after wash or fill.

In Fig. 2 the valve C, of earthenware, glass, or similar material, has a central opening, through which the tubular stem L is inserted, and the margin of the valve is formed with a thread or corrugations $c$, adapting it to hold securely the cap or hood L', which completely incloses the tubular stem L. This cap has apertures around the base just above the valve, adapting it, together with the tubular stem, to operate as a siphon, as hereinafter explained. In this construction M constitutes the valve-seat, being made of the same kind of material as the valve. This valve-seat is secured in the bottom of the tank by means dependent upon its peripheral form, the upper part being expanded to form a flange, said flange being preferably, as illustrated, of conical form, having its lower side beveled. This valve-seat M has the annular upraise or boss $M^2$ about the center, which affords the actual surface for contact of the valve, and has the central aperture $M^3$ extending vertically through it for the passage of the water, said passage $M^3$ being rabbeted at the upper part to form a shoulder $m^3$. Through this opening $M^3$ the spud N is inserted, said spud having a peripheral flange N' at the upper end, which seats on the shoulder $m^3$ and is exteriorly threaded at the lower portion, which protrudes below the valve-seat, and a rim-nut O is screwed onto the protruding end and extends beyond the periphery of the valve-seat at the lower end and laps onto the substance of the bottom of the tank, so that after being tightened up the valve-seat is clamped securely to the said tank bottom. Suitable cement or other packing may be interposed to render the junction of the seat with the bottom water-tight. The projecting end of the spud is adapted for coupling the flushing-pipe, as in the case of the construction shown in Fig. 1. The tubular stem L has a flange $l$ at the lower end, which serves to hold in place the packing-washer E, when such washer is employed, for the purpose of packing the valve-seat, or, as in the form shown in Fig. 1, the valve may be ground to its seat. The aperture through the valve, through which is inserted the tubular stem L, may be formed with an interior thread, and the tubular stem may have suitable exterior thread or partial thread to engage that formed on the valve, and the engagement of these threads may constitute the means of securing the stem L to the valve, and in this case the washer E, which is bound between the flange $l$ and the under face of the valve, constitutes all the packing necessary for this joint. The stem is, however, represented as otherwise secured in Fig. 3, the mode of securing being optional. Guide-bolts D may be provided, as in the form shown in Fig. 1. Such bolts are permanently secured in any convenient way in the substance of the valve or valve-seat. They may be let into sockets formed in the substance of the valve or seat and secured by cement, or may be set in that substance by usual means. They protrude from the part to which they are secured outside of the seating-surface and play in suitable sockets provided in the other part, thereby affording guidance for the valve. As illustrated, they are secured in the seat, and the valve plays on them, as in Fig. 1. The chain H is connected to the top of the hood L' and is operated by the lever H' and pull-chain $H^2$, and when lifted lifts the valve off its seat and permits a free flow of water between the valve and seat, which immediately fills the flushing-pipe, and thus flowing draws the air from the limb L of the siphon and causes the siphon to be promptly primed, and the valve being then seated the siphon continues to operate, drawing the water up through the apertures $l'$ until the tank is evacuated to the level of those apertures. The siphon being then broken by the admission of air at that point, the tank will be refilled by the operation of the usual ball-cock controlling the supply until the water is raised to the level of the upper end of the pipe L, at which point the ball-cock is supposed to be closed; but whether closed or not the water thereafter entering the tank will pass out through the pipe L, which acts as an overflow.

Fig. 3 represents a similar valve to that shown in Fig. 2, but with a goose-neck siphon instead of the hood-siphon shown in Fig. 2, the lifting-chain H being attached to such goose-neck at the upper end and operating the valve in the same way as in Fig. 2.

In the form represented in Fig. 5 I employ glass or earthenware as the material for the hood L' of the siphon, and in order to secure this to the valve, which is also of such material, I make the "coupling," as I term it, P, which I prefer to make of spun brass, having the spun threads P' and $P^2$ at the upper and lower ends, adapting it to screw into the thread $L^2$, molded on the outer surface of the lower end of the glass or earthenware bell L', and into the thread $c$, molded, as described, upon the outer periphery of the valve C. Intermediate the two threaded portions P' and $P^2$ the fitting P is expanded, and in this expanded portion are formed numerous apertures $p$, through which the water is admitted to the siphon. As in the form shown in Figs. 2 and 4, it is admitted through the apertures $l'$ in the bell.

When the valve-seat of glass or earthenware is to be inserted in a wooden-bottomed tank, I prefer the form of construction for such seat which is shown in Fig. 5. In this figure the bottom $A^2$ of the tank, as well as the entire tank, is represented as lined with copper-sheet $A^3$. The valve-seat M is made with the central aperture having the shoulder $m^3$, as in the form shown in Figs. 2 and 4; but the flange M', instead of being tapering, is flat and more extended than in Figs. 2 and 4, and the body of the valve-seat is peripherally threaded below the flange, such thread being molded on it, as in the case of the valve already described, and the aperture formed in the bottom of the tank to receive the seat is correspondingly threaded and is at the upper margin rabbeted to receive the flange M'. The copper lining $A^3$ is folded down into the rabbet, and before the valve-seat is screwed fast in position a leather or rubber gasket $m$ is placed in the rabbet on the margin of the copper lining, folded into the rabbet, as stated, so that when the valve-seat is screwed into the wood its flange M' binds the gasket onto the copper lining and binds the latter to the wood, so that all water is excluded from the joint between the glass or earthenware seat and the wooden bottom. Inside the circumference of the gasket the flange M' has the holes $m'$, through which are inserted the guide-bolts D, the same being provided with proper screw ends to adapt them to screw into the wood. This mode of connecting them is therefore to be preferred to embedding them in the substance of the glass or earthenware seat, and besides that the danger of the cement being cracked by accidental blows or pressure on the bolts is avoided. When the valve-seat is thus screwed into the wooden bottom, the clamp-nut which screws onto the spud-piece to hold it in place in the seat need not lap onto the upper surface of the bottom to clamp it, and is therefore not so illustrated in Fig. 5. When the glass or earthenware is employed, a small opening is formed in the upper end, through which an eyebolt Q is inserted and properly secured by a packing-washer Q' and clamp-nut $Q^2$, such eyebolt serving as a means for attaching the lifting-chain.

I claim—

1. In combination with the tank having bottom discharge-aperture, the valve-seat forming the margin of such aperture being superficially made of glass, earthenware, or similar substance expanded at the upper edge and provided with a shoulder facing upward in the central aperture, a spud adapted to be inserted from above through such central aperture and having a flange adapted to lodge upon such shoulder, and the rim-nut screwed onto the lower protruding end of the spud and extending beyond the margin of the lower end of the seat, whereby the said seat is clamped in the bottom of the tank by means of its upper expanded edge and said rim-nut clamping the substance of the bottom of the tank between them, substantially as set forth.

2. In combination with the tank having bottom discharge-aperture, the valve adapted to seat at the upper margin of such aperture, such valve being superficially made of glass or earthenware or similar substance and having a central vertical aperture through it, said aperture having an interior thread molded in the substance of the valve, a stem adapted to be inserted through said central aperture in the valve and having a flange at the lower end and an exterior thread adapted to engage the molded thread in the valve, and a packing-washer engaged between the flange of said stem and the lower face of the valve and extending beyond said flange to form a seating-surface for the valve, whereby such packing both renders tight the connection of the stem with the body and also forms the seating-surface, substantially as set forth.

3. In combination with a tank having a bottom discharge-aperture, the valve adapted to seat at the upper margin of such aperture, such valve being superficially made of glass, earthenware, or similar substance having a central aperture through it and peripherally threaded or corrugated, the tubular stem inserted through the central aperture and making water-tight junction with the said valve-body and the hood inclosing said tubular stem and joined to the margin of the valve-body by engagement with its thread or corrugations and apertured at the lower part of the valve-body, whereby said tubular stem and hood constitute a siphon receiving around the margin of the valve and discharging through the center, and the lifting-chain attached to the upper end of the hood, whereby the same serves as a stem to operate a valve, substantially as set forth.

4. In a siphon-valve, in combination with the valve-body having a tubular stem discharging through the valve-body, the glass bell inverted over the stem, and a metallic coupling joining the bell to the body and apertured below the bell to form the intake of the siphon above the valve-body, substantially as set forth.

5. A tank-valve comprising a body of vitrified material having a central aperture and a tubular stem inserted through said aperture and making water-tight joint therein, a bell or hood of vitrified material adapted to inclose the upper portion of the tubular stem, a thread being molded upon the hood at the lower end and upon the periphery of the valve-body, and a metal coupling threaded at both ends to adapt it to be screwed onto such valve-body and hood and having apertures intermediate such threaded portions, substantially as set forth.

In testimony whereof I hereunto set my hand, at Passaic, New Jersey, in the presence of two witnesses.

FRANK A. WELLS.

Witnesses:
W. R. EVANS,
B. S. ASHBY.